W. CRONIN.
MEANS FOR SECURING HEADS TO SPOOLS.
APPLICATION FILED JAN. 19, 1911.

1,078,419.

Patented Nov. 11, 1913.

Witnesses-
Wm. A. Barr.
Walter F. Pullinger

Inventor-
William Cronin.
by his Attorneys.

UNITED STATES PATENT OFFICE.

WILLIAM CRONIN, OF PHILADELPHIA, PENNSYLVANIA.

MEANS FOR SECURING HEADS TO SPOOLS.

1,078,419.  Specification of Letters Patent.  Patented Nov. 11, 1913.

Application filed January 19, 1911. Serial No. 603,527.

*To all whom it may concern:*

Be it known that I, WILLIAM CRONIN, a citizen of the United States, residing in Philadelphia, Pennsylvania, have invented certain Improvements in Means for Securing Heads to Spools, of which the following is a specification.

My invention relates to certain improvements in spools upon which yarn is wound. This invention is particularly adapted for spools used in mules.

The object of the invention is to so construct the means for attaching the heads to the body of the spool that the heads will not become loose and cannot be accidentally detached. When it is desired to remove the heads, the parts can be quickly separated and repaired, if necessary. Spools of this type are frequently subjected to rough usage as they are often thrown on the floor when the yarn is unwound from them and, owing to the number of spools used, it is essential that the heads be made so as to be attached to the body portion in a simple and inexpensive manner.

Figure 1:
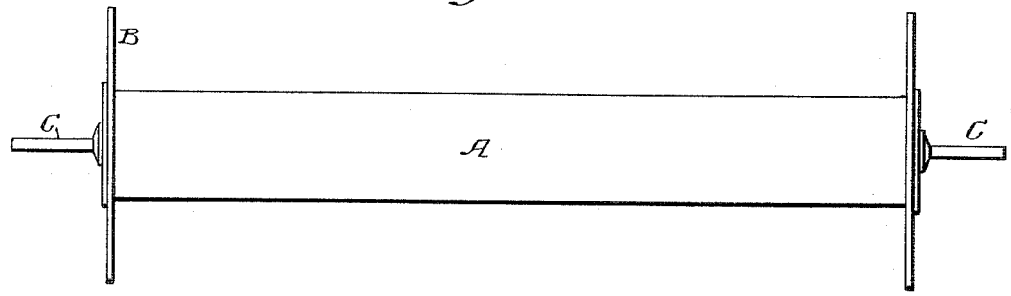
Figure 2:
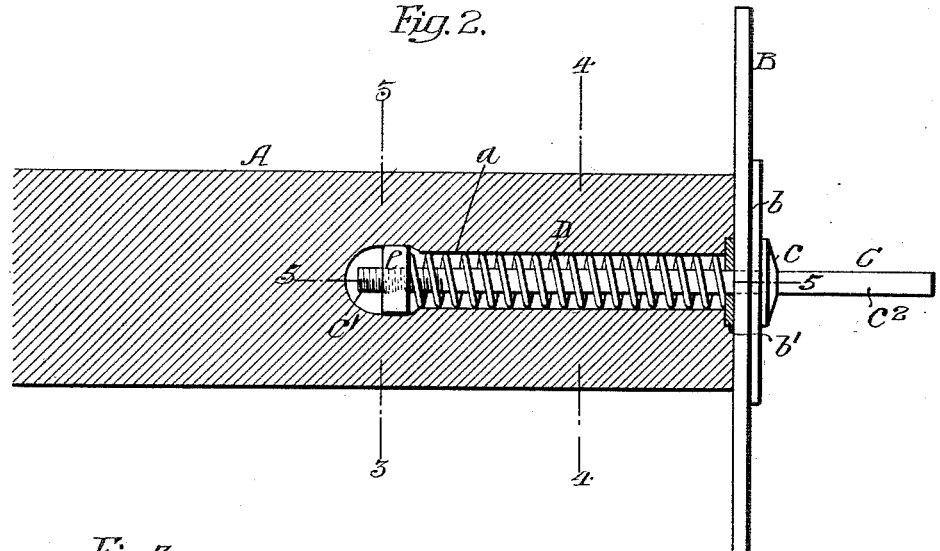
Figure 3:
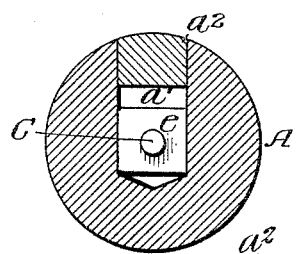
Figure 4:
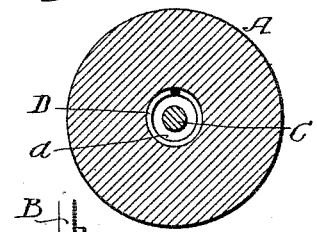
Figure 5:
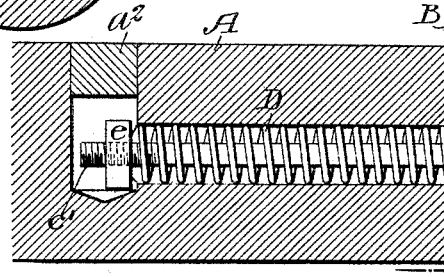

In the accompanying drawing:—Figure 1 is a side view of a spool to which my invention is applied; Fig. 2, is a longitudinal sectional view of one end of the spool; Fig. 3, is a transverse sectional view on the line 3—3, Fig. 2; Fig. 4, is a transverse sectional view on the line 4—4, Fig. 2; and Fig. 5, is a sectional view on the line 5—5, Fig. 2.

A is the body of the spool, which is usually made of wood and in each end of the body is drilled a hole $a$ which communicates with a transverse opening $a'$ and in this opening is mounted a nut $e$. The nut is square in the present instance, being prevented from turning by fitting snugly in the opening $a'$ and after the nut is in position a plug $a^2$ is inserted in the opening.

C is a spindle having a flange $c$ made integral with it and B is the head, made of any suitable material, preferably of fiber, and this head is perforated for the passage of the spindle C.

$b$ is a washer fitting between the head and flange $c$, and mounted in the recess in the end of the body portion A is a washer $b'$.

The spindle C is screw threaded at its rear end $c'$ and is adapted to the nut $c$. Fitting within the opening $a$ in the body is a spring D. The spindle C extends through the spring and the spring is confined longitudinally between the washer $b'$ and the nut $e$ so that by this construction the threads of the spindle are held firmly against the threads of the nut, preventing the spindle from turning in the nut. The portion $c^2$ of the spindle projects a sufficient distance so as to rest in a bearing in the machine in which the spool is used.

In assembling the parts the nut is first placed in the transverse opening $a'$ and then the spindle with the head, washers and spring mounted thereon is placed in the opening $a$ and the spindle turned so that its thread will engage the threads of the nut $e$, and as the spindle is turned the head will be drawn tightly against the body portion A and the spring, which is comparatively heavy, will be compressed so that when the parts are firmly united the spring will prevent the accidental displacement of the parts.

It will be understood that the construction illustrated in Fig. 2 is duplicated at the opposite end of the spool and as these spools are usually several feet in length it is essential that the heads be attached firmly to the spools, so that when they are dropped the heads will not become loose, yet the means for attaching the heads must be so designed that the heads can be readily removed, when necessary, as in the event of a head breaking.

Devices have been designed to attach the heads firmly to the bodies of spools, but these devices are objectionable on account of the fact that while they may hold the head rigidly in position, the head cannot be quickly removed in the event of repairs being necessary.

I claim:—

1. The combination in a spool, of a body portion having a longitudinal opening in one end thereof; a nut located at the inner end of the opening and prevented from turning in the spool; a disk head adapted to rest against the end of the body portion and having an opening; a threaded spindle having a flange bearing against the disk head, the spindle extending through the head and engaging the nut; and a coiled spring mounted between the nut and the disk head, whereby longitudinal stress is placed upon the spindle increasing the frictional bearing of the spindle in the nut and preventing the accidental loosening of the head, yet allowing the spindle to be removed, when necessary, without disturbing the nut.

2. The combination in a spool, of a body portion having a longitudinal opening in each end; a transverse opening communicating with the end of each longitudinal opening; a nut fitting snugly in the transverse opening in line with the longitudinal opening and prevented from turning therein by the walls of the opening; a permanent block inserted in the transverse opening so as to close said opening; a disk head resting against each end of the body portion; a threaded spindle adapted to each longitudinal opening and extending through the disk head and having a flange bearing against the outer surface of the disk head, the screw thread of the spindle meshing with the thread of the nut, the spindle extending beyond the head of the spool; and a coiled spring surrounding each spindle, one end of the coiled spring bearing against the nut and the other bearing against the disk head so that on turning the spindle to draw the disk head against the end of the body of the spool, the spring will be compressed and will exert sufficient pressure to prevent accidental turning of the disk head and the spindle.

In testimony whereof, I have signed my name to this specification, in the presence of two subscribing witnesses.

WILLIAM CRONIN.

Witnesses:
 WALTER CHISM,
 WM. A. BARR.

Copies of this patent may be obtained for five cents each, by addressing the "Commissioner of Patents, Washington, D. C."